US 6,560,453 B1

(12) United States Patent
Henry, Jr. et al.

(10) Patent No.: US 6,560,453 B1
(45) Date of Patent: May 6, 2003

(54) SYSTEMS, METHODS, AND COMPUTER PROGRAM PRODUCTS FOR DYNAMICALLY ADJUSTING THE PAGING CHANNEL MONITORING FREQUENCY OF A MOBILE TERMINAL BASED ON THE OPERATING ENVIRONMENT

(75) Inventors: Raymond C. Henry, Jr., Wake Forest, NC (US); Richard M. Abdella, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/501,491

(22) Filed: Feb. 9, 2000

(51) Int. Cl.$^7$ ................................. H04B 1/16
(52) U.S. Cl. ........................ 455/343; 455/574
(58) Field of Search ................ 455/343, 574, 455/505, 515, 517, 456, 458, 422, 566, 573

(56) References Cited

U.S. PATENT DOCUMENTS

| | | | |
|---|---|---|---|
| 5,095,308 A | 3/1992 | Hewitt | 340/825.44 |
| 5,128,938 A | 7/1992 | Borras | 370/95.1 |
| 5,465,394 A | 11/1995 | Pinault et al. | 455/54.1 |
| 5,991,635 A | 11/1999 | Dent et al. | 455/517 |
| 6,119,024 A * | 9/2000 | Takayama | 340/7.21 |
| 6,240,288 B1 * | 5/2001 | Wan et al. | 455/426 |
| 6,289,227 B1 * | 9/2001 | Shi | 340/7.32 |

FOREIGN PATENT DOCUMENTS

| | | |
|---|---|---|
| EP | 0 666 676 A2 | 8/1995 |
| EP | 0782359 A2 | 12/1996 |
| GB | 2 328 588 A | 2/1999 |
| WO | WO 94/13089 | 6/1994 |
| WO | WO 96/08941 | 3/1996 |
| WO | WO 98/27769 | 6/1998 |
| ZA | 9205762 | 4/1993 |

OTHER PUBLICATIONS

International Search Report, PCT/US/01/01373, May 28, 2001.

Search Report, GB 9816270,4, Dec. 16, 1998.

International Search Report, PCT/US97/22972, Nov. 24, 1998.

* cited by examiner

*Primary Examiner*—Vivian Chin
*Assistant Examiner*—Tu X Nguyen
(74) *Attorney, Agent, or Firm*—Myers Bigel Sibley & Sajovec, P.A.

(57) ABSTRACT

A paging channel may be monitored for incoming calls to a mobile terminal by determining a current operating environment of the mobile terminal and then adjusting the paging channel monitoring frequency based on the current operating environment. Realizing that decreased power consumption may be preferred to improved responsiveness to incoming calls in some operating environments while improved responsiveness to incoming calls may be preferred to decreased power consumption in other operating environments, a mobile terminal may dynamically balance responsiveness to incoming calls with power consumption in accordance with its operating environment rather than being limited to a static or semi-static balance between the two performance criteria.

38 Claims, 12 Drawing Sheets

SYSTEMS, METHODS, AND COMPUTER PROGRAM PRODUCTS FOR DYNAMICALLY ADJUSTING THE PAGING CHANNEL MONITORING FREQUENCY OF A MOBILE TERMINAL BASED ON THE OPERATING ENVIRONMENT

BACKGROUND OF THE INVENTION

The present invention relates generally to the field of communication, and, more particularly, to cellular communication systems that use a paging channel, which a mobile terminal can monitor to check for incoming calls.

Wireless or cellular communication systems are commonly used to provide voice and data communication services to subscribers. A typical terrestrial cellular radiotelephone communication system 20 is illustrated in FIG. 1. The cellular radiotelephone system 20 may include one or more mobile terminals or radiotelephones 22a,b,c, that communicate via a plurality of cells 24a,b,c served by base stations 26a,b,c and a mobile switching center (MSC) 28. Although only three cells 24a,b,c are shown, a typical cellular network may include hundreds of cells, multiple MSCs 28, and may serve thousands of mobile terminals 22a,b,c.

The cells 24a,b,c generally serve as nodes in the communication system 20 from which links are established between the mobile terminals 22a,b,c and the MSC 28 by way of the base stations 26a,b,c serving the cells 24a,b,c. Each cell 24a,b,c will typically have allocated to it one or more dedicated control channels and one or more traffic channels. A control channel is a dedicated channel used for transmitting such things as cell identification and paging information. A traffic channel carries the voice and data information. A duplex radio communication link may be established through the cellular network 20 between two mobile terminals 22a,b,c or between a mobile terminal 22a,b,c and a wireline telephone user 32 through the public switched telephone network (PSTN) 34. A function of the base stations 26a,b,c is to handle radio communication between the cells 24a,b,c and the mobile terminals 22a,b,c. In this capacity, the base stations 26a,b,c may function as a relay station for data and voice signals.

As discussed in the foregoing, mobile terminals 22a,b,c may obtain paging information from a base station 26a,b,c over a control channel, which is typically referred to as a paging channel. A base station 26a,b,c will transmit a page to a mobile terminal 22a,b,c to notify the mobile terminal 22a,b,c that it has an incoming call. To conserve battery resources, a mobile terminal 22a,b,c will generally not monitor the paging channel continuously, but will instead check for an incoming page on a periodic basis. Accordingly, the paging channel is generally divided into time slots or time intervals and a mobile terminal 22a,b,c will periodically monitor the paging channel during specific time intervals to check for an incoming page. The frequency with which a mobile terminal 22a,b,c monitors the paging channel is typically controlled by a parameter called the slot cycle index (SCI).

The SCI parameter may be used to control when a mobile terminal 22a,b,c "sleeps" and when a mobile terminal 22a,b,c "wakes up" to check for incoming calls. For example, if the SCI parameter is set to one, then a mobile terminal 22a,b,c will monitor every time slot or time interval of the paging channel to check for an incoming call. While this SCI setting may provide the best responsiveness to incoming calls, it may also prematurely expend battery resources. If the SCI parameter is set to two, then a mobile terminal 22a,b,c will monitor every other time slot. Similarly, if the SCI parameter is set to three, then a mobile terminal 22a,b,c will monitor every third time slot. By setting the SCI parameter to a higher number, a mobile terminal 22a,b,c will spend a higher percentage of its time "sleeping" and, thus, conserve battery power. This conservation of battery resources, however, comes at the expense of diminished responsiveness to incoming calls. Moreover, if the SCI parameter is set too high, then a landline caller may hang-up prematurely because of the lengthy delay before the mobile terminal 22a,b,c detects the page associated with the incoming call and begins to ring.

A mobile phone user may program a desired SCI parameter, but the service provider typically sets it to a single, constant value. Generally, this value is set to provide a suitable balance between battery life and responsiveness to incoming calls. Nevertheless, this single SCI setting may not be desirable in all operating environments or scenarios.

SUMMARY OF THE INVENTION

A paging channel may be monitored for incoming calls to a mobile terminal by determining a current operating environment of the mobile terminal and then adjusting the paging channel monitoring frequency based on the current operating environment. The present invention stems from the realization that decreased power consumption may be preferred to improved responsiveness to incoming calls in some operating environments while improved responsiveness to incoming calls may be preferred to decreased power consumption in other operating environments. Advantageously, a mobile terminal, in accordance with the present invention, may dynamically balance responsiveness to incoming calls with power consumption in accordance with its operating environment rather than being limited to a static or semi-static balance between the two performance criteria.

In accordance with an aspect of the invention, user input may be obtained to associate operating environments with corresponding paging channel monitoring frequencies. In particular, a user may be presented with a menu containing a list of operating modes for the mobile terminal with each operating mode being associated with an operating environment. Exemplary operating modes may include, but are not limited to, an external power performance mode, a time of day performance mode, an enhanced performance environment mode, and a usage pattern performance mode.

The external power performance mode is associated with an operating environment in which an external power supply is connected to the mobile terminal. In this operating environment, it is generally desirable to increase the paging channel monitoring frequency as power conservation is not a concern. The time of day performance mode is associated with an operating environment in which local times have been programmed by a user that identify extended sleep cycle intervals in which it is desirable decrease the paging channel monitoring frequency to conserve power and enhanced responsiveness sleep cycle intervals in which it is desirable to increase the paging channel monitoring frequency to provide improved responsiveness to incoming calls. The enhanced performance environment mode is associated with an operating environment in which it is desirable to increase the paging channel monitoring frequency because call traffic in this operating environment is frequently above average. Examples of enhanced performance operating environments may include a home base station, a wireless local loop system, or a private campus system. Finally, the usage pattern performance mode is associated with an operating environment in which the mobile terminal collects incoming call statistics for the mobile terminal and, based on these statistics, defines times for extended sleep cycles and/or enhanced responsiveness sleep cycles.

In accordance with another aspect of the invention, the paging channel monitoring frequency may be adjusted by adjusting the value of the slot cycle index (SCI) parameter and then transmitting the SCI parameter value to a base station.

Thus, the present invention may allow a user to program their mobile terminal to provide a level of responsiveness to incoming calls that is tailored to their individual preference.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
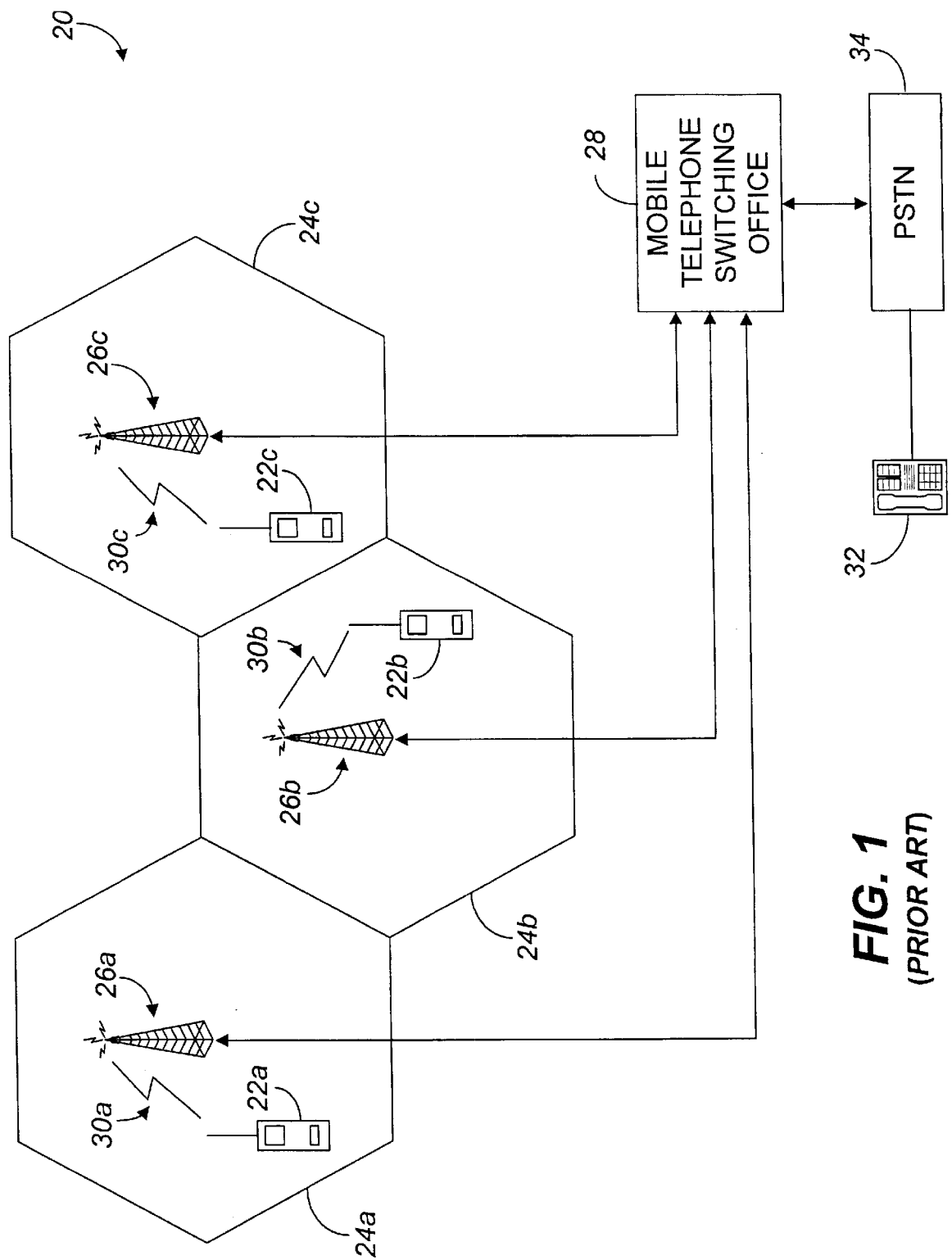
FIG. 1 is a diagram that illustrates a conventional terrestrial cellular network.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the claims. Like reference numbers signify like elements throughout the description of the figures.

The present invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver that includes a radiotelephone transceiver. Mobile terminals may also be referred to as "pervasive computing" devices.

Furthermore, a mobile terminal, in accordance with the present invention, may be designed to communicate with a base station using, for example, frequency division multiple access (FDMA) technology (e.g., the advanced mobile phone service (AMPS) standard); time division multiple access (TDMA) technology (e.g., the Telecommunication Industry Association (TIA)/Electronic Industries Association (EIA) 136 or digital AMPS (DAMPS) standard or the global system for mobile communication (GSM) standard); or code division multiple access (CDMA) technology (e.g., the TIA interim standard (IS) 95).

The present invention may be embodied as a mobile terminal, a wireless communication system, a method, and/or a computer program product. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
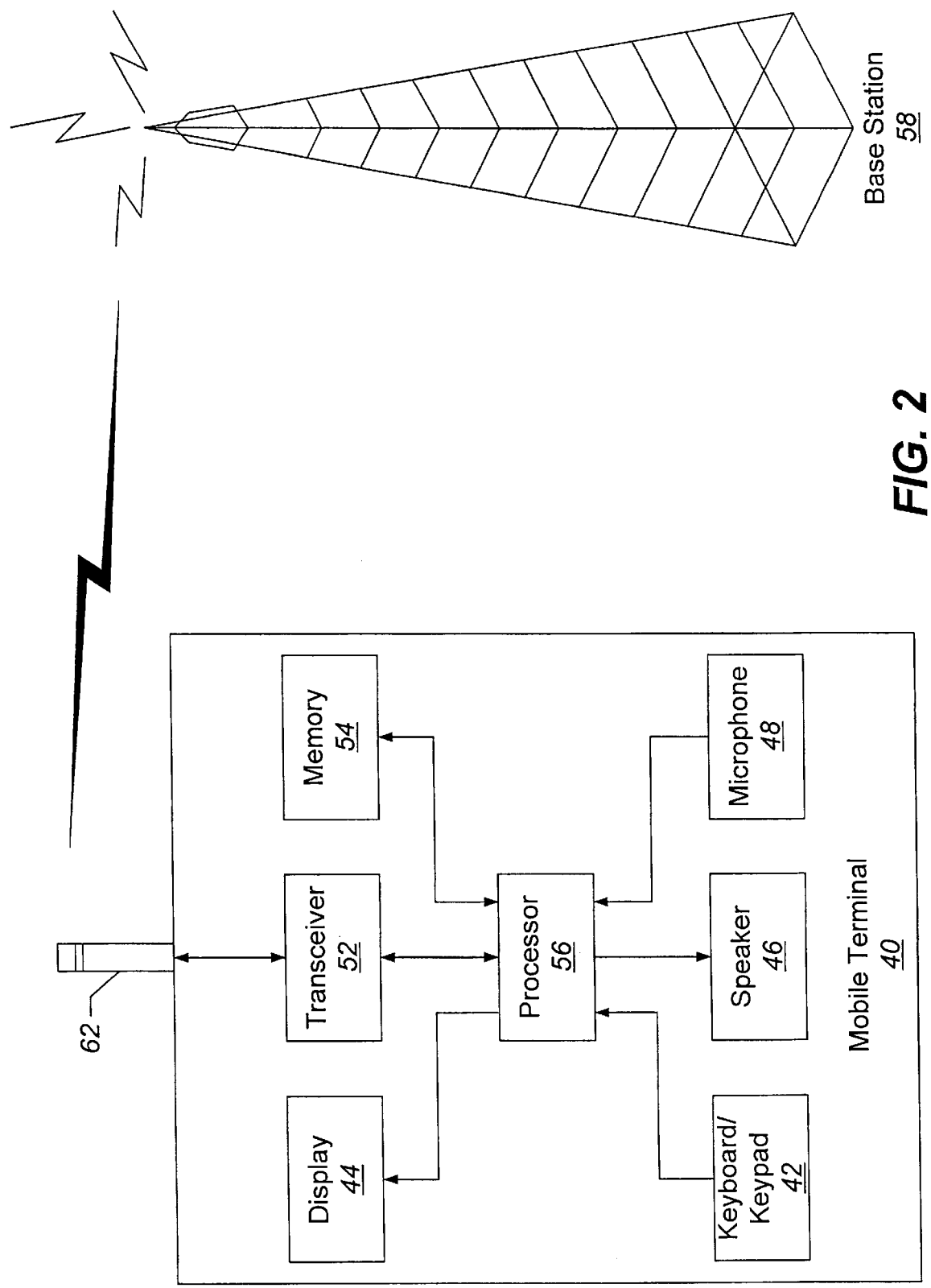
FIG. 2 is a high-level diagram of an exemplary wireless communication system that illustrates mobile terminals, systems, methods, and computer program products in accordance with the present invention.

Referring now to FIG. 2, a mobile terminal 40 suitable for use with the present invention typically includes a keyboard/keypad 42, a display 44, a speaker 46, a microphone 48, a transceiver 52, and a memory 54 that communicate with a processor 56. The transceiver 52 receives incoming signals from a base station 58 and transmits outgoing signals to the base station 58 via an antenna 62. These signals may comprise both traffic and control signals (e.g., paging signals/messages for incoming calls), which are used to establish and maintain communication with another party or destination. These components are included in many conventional mobile terminals and their functionality is generally known to those skilled in the art.

Figure 3:
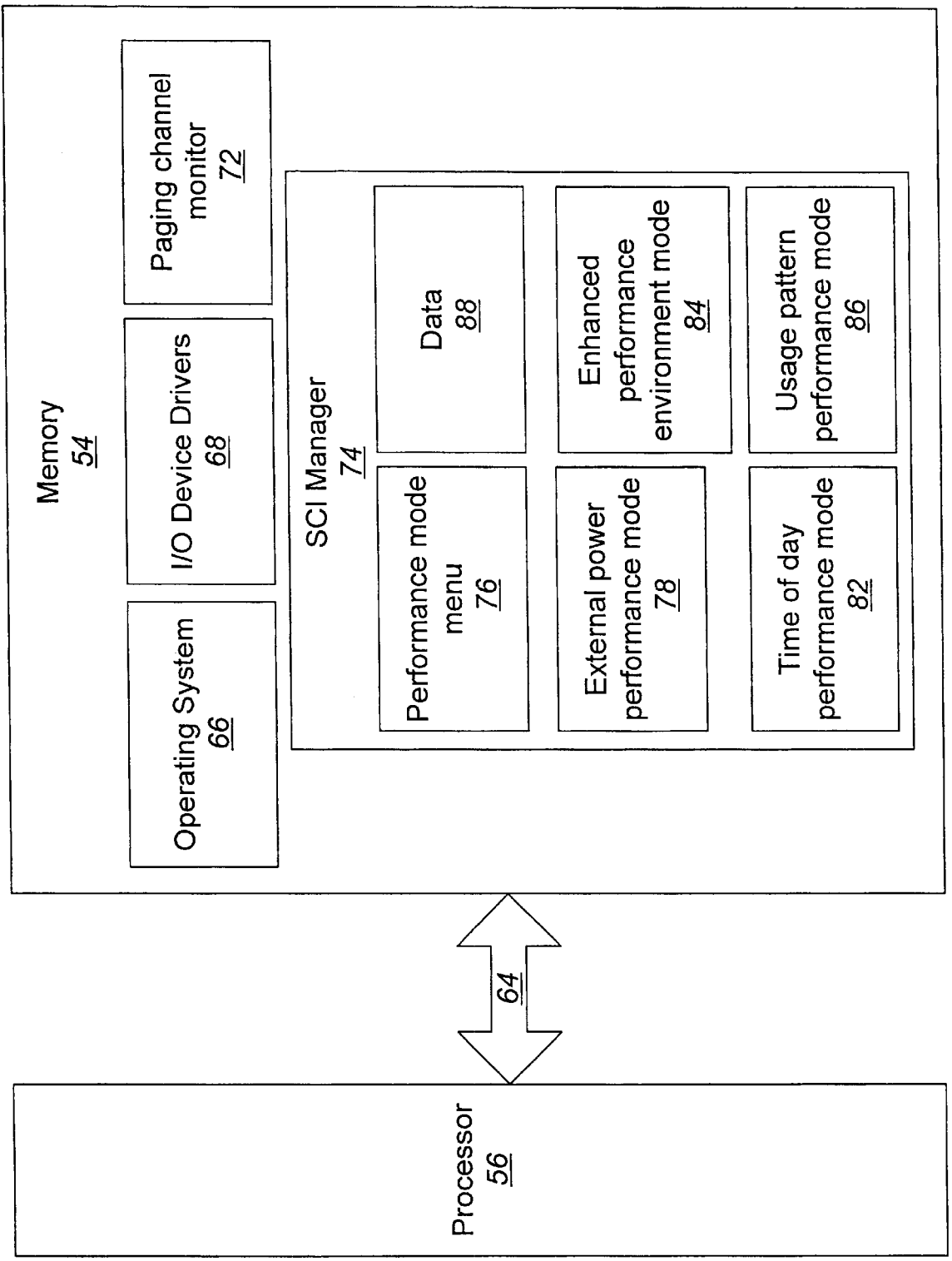
FIG. 3 is a block diagram that illustrates a processor and memory shown in FIG. 2 in greater detail.

FIG. 3 illustrates the processor 56 and memory 54 configured according to an embodiment of the present invention in more detail. The processor 56 communicates with the memory 54 via an address/data bus 64. The processor 56 may be any commercially available or custom microprocessor suitable for an embedded application. The memory 54 is representative of the overall hierarchy of memory devices containing the software and data used to implement the functionality of the mobile terminal 40. The memory 54 may include, but is not limited to, the following types of devices: cache, ROM, PROM, EPROM, EEPROM, flash, SRAM, and DRAM.

As shown in FIG. 3, the memory 54 may hold four major categories of software and data used in the mobile terminal 40: the operating system 66; the input/output (I/O) device drivers 68; the paging channel monitor program module 72; and the slot cycle index (SCI) manager program module 74. The operating system 66 should be designed for real time embedded applications and, preferably, is relatively compact to make efficient use of the memory 54. The I/O device drivers 68 typically include software routines accessed through the operating system 66 to communicate with devices such as the keyboard/keypad 42, display 44, speaker 46, microphone 48, and certain memory 54 components.

The paging channel program module 72 may comprise programs for monitoring the paging channel to check for incoming calls destined for the mobile terminal 40. In particular, the paging channel program module 72 may use the SCI parameter to determine the frequency with which the paging channel will be examined to check for an incoming call. For example, if the SCI parameter is set to one, then the paging channel monitor program module 72 will monitor every time slot or time interval of the paging channel to check for an incoming call. If the SCI parameter is set to two, then the paging channel monitor program module 72 will monitor every other time slot. Similarly, if the SCI parameter is set to three, then the paging channel monitor program module 72 will monitor every third time slot. Thus, for this example, the inverse of the SCI parameter corresponds to the fraction of paging channel time slots or time intervals that will be monitored by the paging channel monitor program module 72 to check for incoming calls. As discussed hereinabove, larger values for the SCI parameter may reduce power consumption as the mobile terminal 40 spends a greater percentage of time in a sleep mode. The savings in reduced power consumption, however, are generally accompanied by a diminished responsiveness to incoming calls. Conversely, smaller values for the SCI parameter may improve responsiveness, but at the expense of increased power consumption and shorter battery life.

The SCI manager program module 74 may include programs for determining a current operating environment for the mobile terminal 40 and dynamically adjusting the paging channel monitoring frequency based on the current operating environment. In particular, the SCI manager program module 74 may include programs for dynamically adjusting the value of the SCI parameter based on the current operating environment. As shown in FIG. 3, the SCI manager program module 74 includes a performance mode menu module 76, which allows a user to program operating environment indicia into the mobile terminal 40. Preferably, the performance mode menu module 76 provides a menu that identifies one or more operating modes for the mobile terminal 40 which are respectively associated with particular operating environments. The operating modes may be selected by a user to tailor the performance of the mobile terminal 40 in accordance with the user's preferences.

The SCI manager program module 74 may further comprise an external power performance mode module 78, a time of day performance mode module 82, an enhanced performance environment mode module 84, and/or a usage pattern performance mode module 86. These four modules correspond to four exemplary operating modes for the mobile terminal 40, which are associated with four respective operating environments. The external power performance mode module 78 determines if the mobile terminal 40 has an external power supply connected thereto and then dynamically adjusts the SCI parameter accordingly. The time of day performance mode module 82 dynamically adjusts the SCI parameter based on preprogrammed time settings, which are typically entered by the user. The enhanced performance environment mode module 84 determines if the mobile phone 40 is currently being used in an enhanced performance environment setting and then adjusts the SCI parameter accordingly. Examples of enhanced performance environment settings may include a home base station application, a wireless local loop/fixed cellular application, or a private campus application. The usage pattern performance mode module 86 may be used to collect incoming call statistics for the mobile terminal, which, in cooperation with the time of day performance mode module 82, may be used to dynamically adjust the SCI parameter based on time settings derived from the incoming call statistics. Finally, the data module 88 contains both static and dynamic data used by the SCI manager program module 74.

Computer program code for carrying out operations of the paging channel monitor program module 72 and the SCI manager program module 74 is preferably written in a high-level programming language, such as C or C++ for development convenience. Nevertheless, some modules or routines may be written in assembly language or even micro-code to enhance performance and/or memory usage. While the paging channel monitor program module 72 and the SCI manager program module 74 reside on the mobile terminal 40 in a preferred embodiment of the present invention, program code from these modules may also execute partly on the mobile terminal 40 and partly on the base station 58.

As will be further appreciated by those skilled in the art, the functionality of the paging channel monitor program module 72 and the SCI manager program module 74 may also be implemented as discrete hardware components, as a single application specific integrated circuit (ASIC), or as a programmed digital signal processor or microcontroller.

The present invention is described hereinafter with reference to flowchart and/or block diagram illustrations of mobile terminals, cellular/wireless communication systems, methods, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4A:
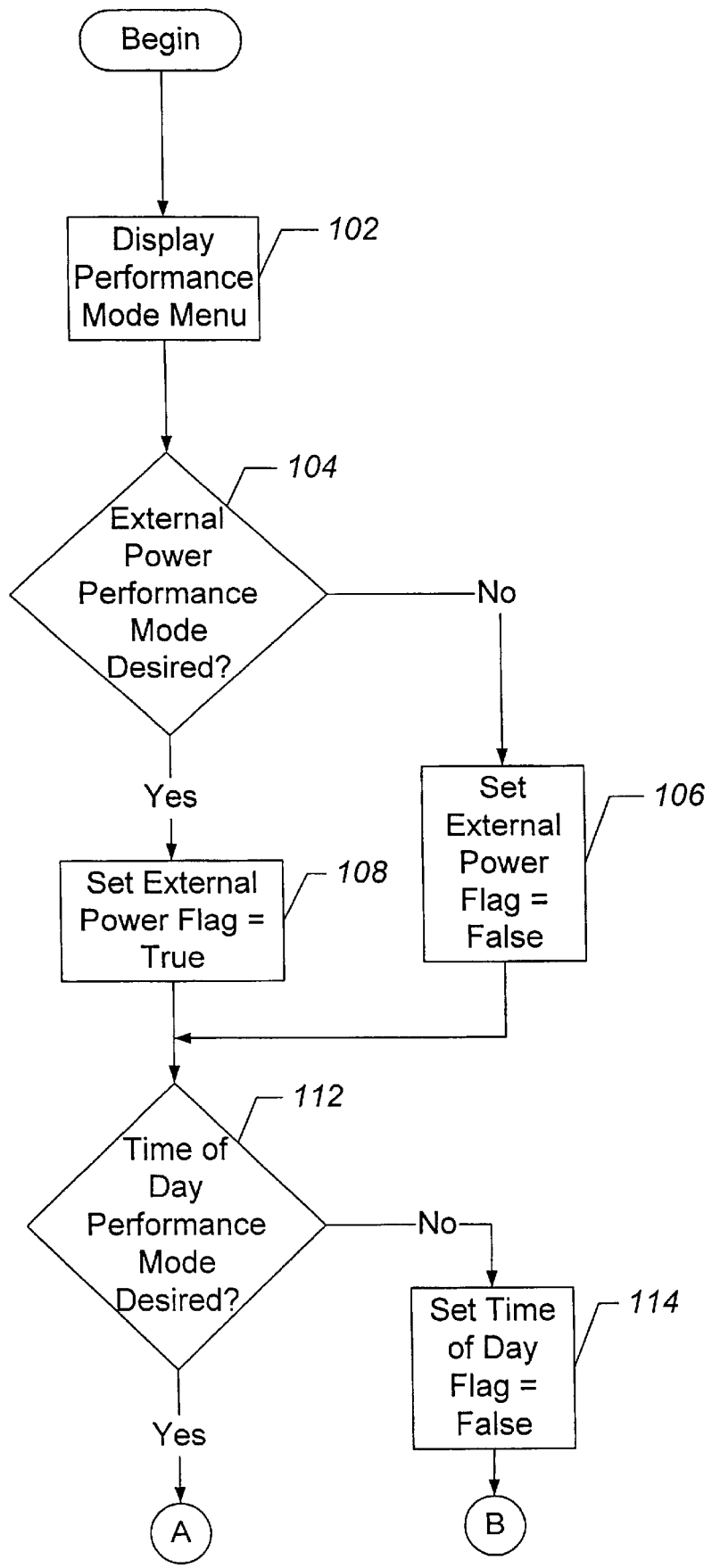
FIGS. 4A–4C are a flow chart that illustrate exemplary operations of a user interface for associating operating environments with corresponding paging channel monitoring frequencies in a mobile terminal of FIG. 2.

With reference to the flowchart of FIG. 4A, exemplary operations of a user interface provided by the performance mode menu module 76, which can be used to program operating environment indicia into the mobile terminal 40, will be described hereafter. Operations begin at block 102 where the performance mode menu module 76 displays a menu on the display 44 of the mobile terminal 40, which identifies one or more operating modes for the mobile terminal 40. These operating modes are associated with particular operating environments and, in a preferred embodiment of the present invention, comprise an external power performance mode, a time of day performance mode, an enhanced performance environment mode, and a usage pattern performance mode. The present invention is not limited to these operating modes and environments, but on the contrary, additional or different operating modes and environments may be defined for which it is desirable to dynamically adjust the frequency by which the paging channel is monitored for incoming calls for increased performance.

The user may then select one or more of these operating modes from the menu to tailor the performance (i.e., responsiveness to incoming calls versus power conservation) according to their own preferences. Thus, at block 104, the performance mode menu module 76 determines if the external power performance mode has been selected. If the external power performance mode has not been selected, then an external power flag is set to a "false" value at block 106. Otherwise, if the user has selected the external power performance mode, then the external power flag is set to a "true" value at block 108.

Figure 4B:
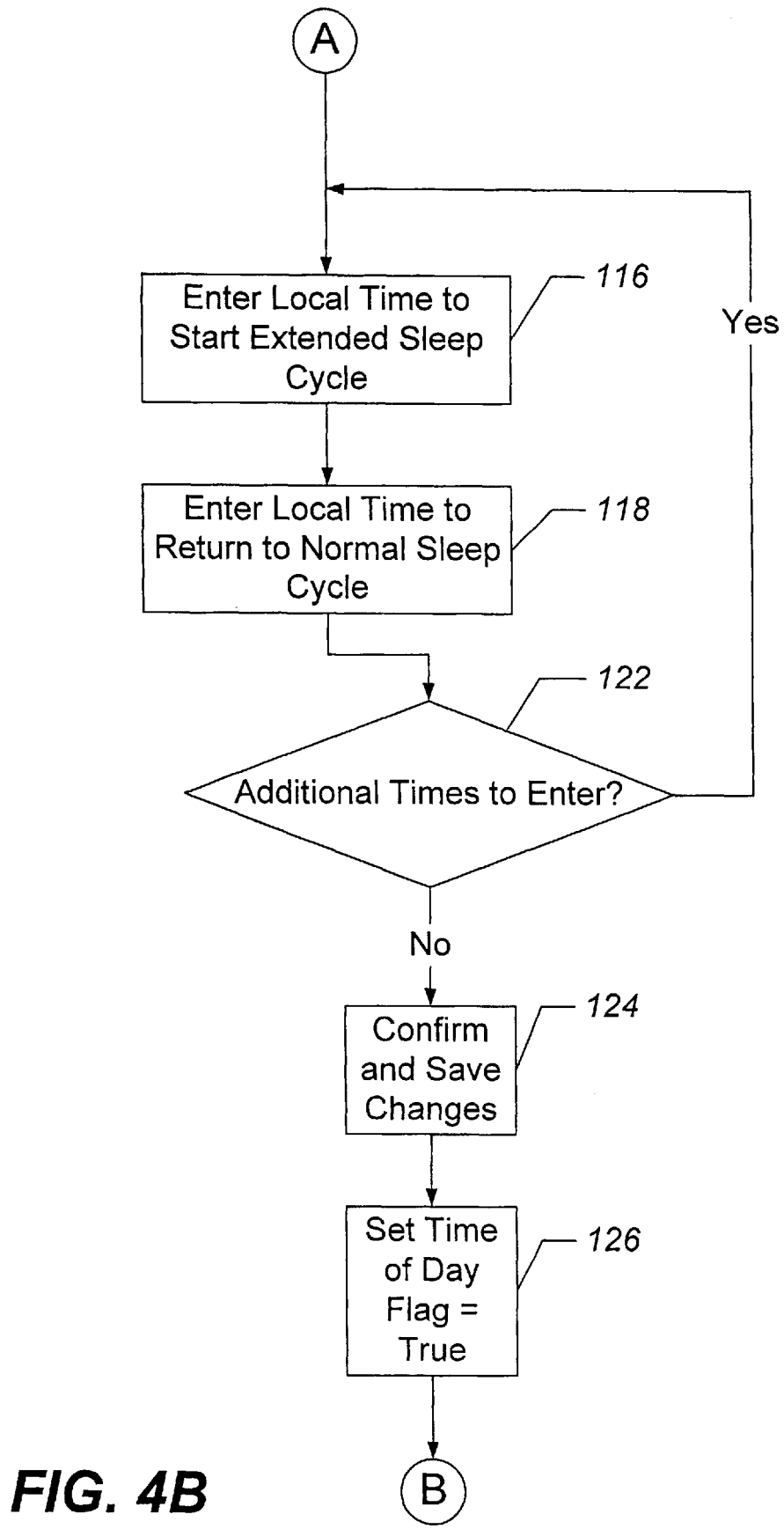

At block 112, the performance mode menu module 76 determines if the time of day performance mode has been selected. If the time of day performance mode has not been selected, then a time of day flag is set to a "false" value at block 114. Otherwise, if the time of day performance mode has been selected by the user, then operations continue by following connector A to FIG. 4B where the user is prompted at block 116 to enter a local time at which to start an extended sleep cycle (i.e., reduce the paging channel monitoring frequency). After a start time has been entered at block 116, the user is then prompted at block 118 to enter a local time at which to end the extended sleep cycle and return to the previous or normal sleep cycle. The user may then be given the opportunity at block 122 to enter additional times for switching from an extended sleep cycle to a normal sleep cycle and vice versa. If the user wishes to enter these additional times, then they may be entered at blocks 116 and 118. In an alternative embodiment, the user may also be provided with an opportunity to enter times at which to start an enhanced responsiveness cycle (i.e., increase the paging channel monitoring frequency) and to end the enhanced responsiveness cycle and return to the previous or normal sleep cycle.

Once the user has entered all the times that they wish to enter, the performance mode menu module 76 provides a confirmation prompt for the user at block 124. If the user confirms the time entries, then the performance mode menu module 76 saves the time entries as part of the data module 88 for use by the time of day performance mode module 82. Finally, at block 126, the time of day performance flag is set to a "true" value.

Figure 4C:
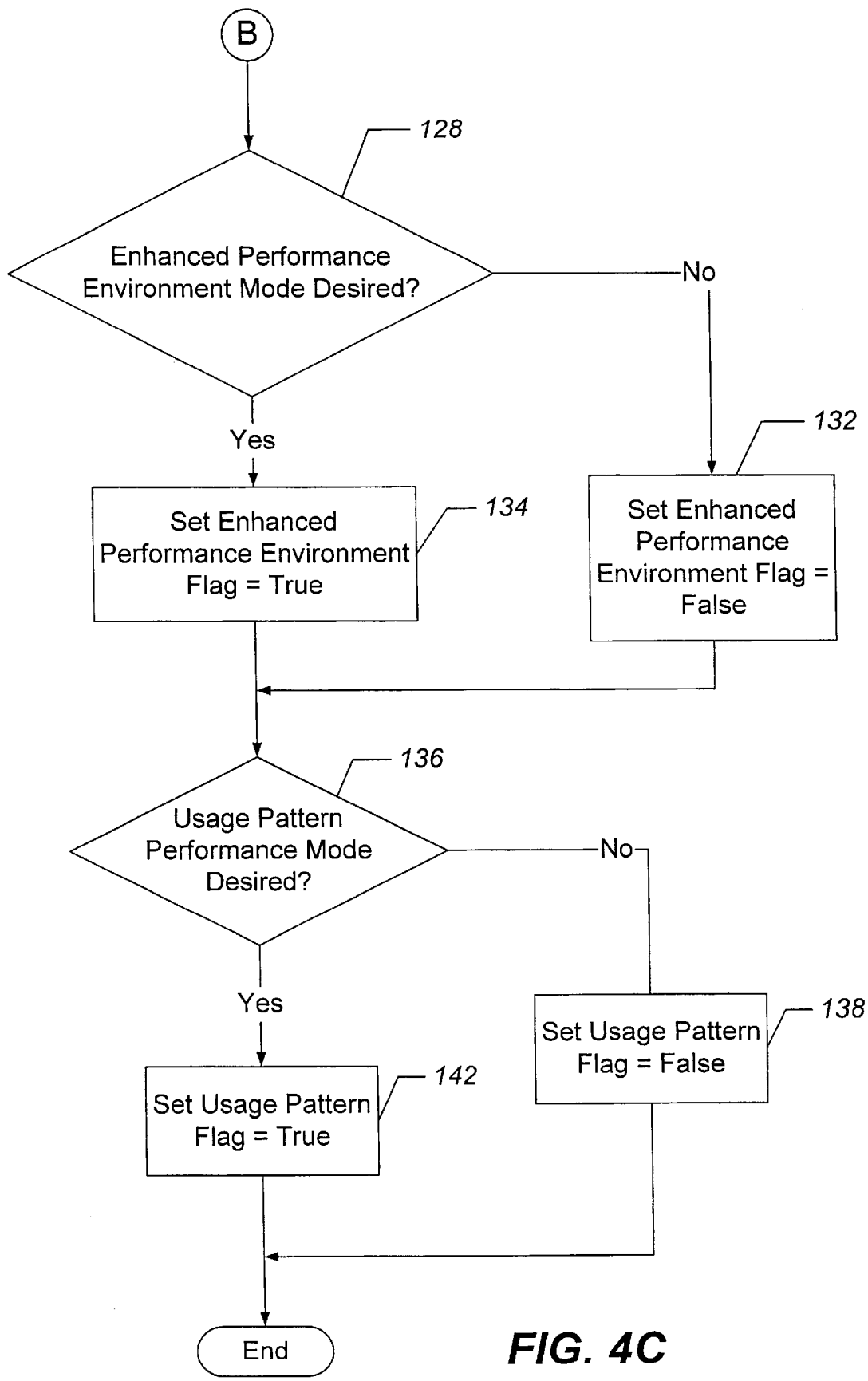

Following connector B to FIG. 4C, operations continue at block 128 where the performance mode menu module 76 determines if the enhanced performance environment mode has been selected. If the enhanced performance environment mode has not been selected, then an enhanced performance environment flag is set to a "false" value at block 132. Otherwise, if the user has selected the enhanced performance environment mode, then the enhanced performance environment flag is set to a "true" value at block 134.

Similarly, at block 136, the performance mode menu module 76 determines if the usage pattern performance mode has been selected. If the usage pattern performance mode has not been selected, then a usage pattern flag is set to a "false" value at block 138. Otherwise, if the user has selected the usage pattern performance mode, then the usage pattern flag is set to a "true" value at block 142.

Figure 5:
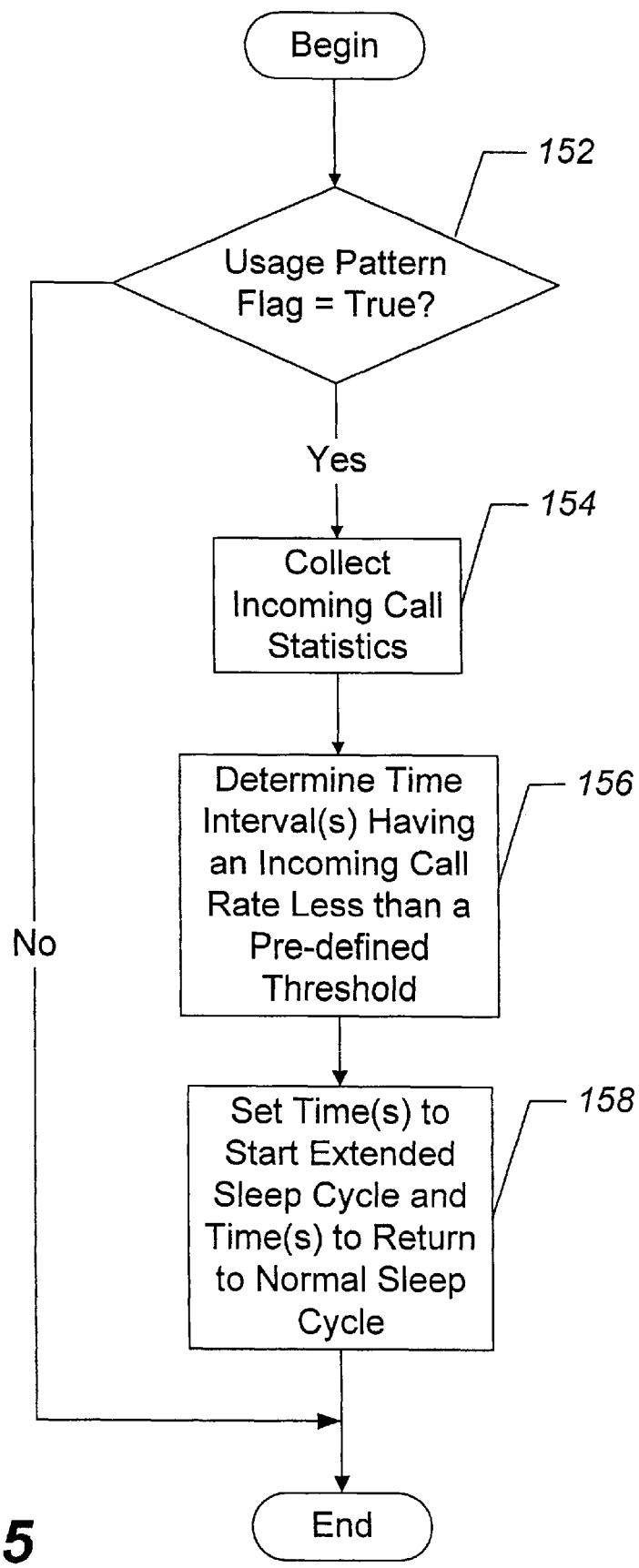
FIG. 5 is a flow chart that illustrates exemplary operations of a mobile terminal of FIG. 2 in usage pattern performance mode.

Referring now to FIG. 5, exemplary operations of the usage pattern performance mode module 86 will be described hereafter. Rather than entering specific times at which to start and end an extended sleep cycle (i.e., reduce the paging channel monitoring frequency) or start and end an enhanced responsiveness cycle (i.e., increase the paging channel monitoring frequency), a user may prefer to let the mobile phone 40 set these times automatically based on a profile of the user's calling patterns. In this regard, the user may select the usage pattern performance mode option as discussed hereinabove with reference to FIG. 4C. The usage pattern performance mode module 86 checks whether the usage pattern performance mode has been selected at block 152 by examining the usage pattern flag stored in the data module 88. If the usage pattern flag is set to a "true" value, then the usage pattern performance mode module 86 collects incoming call statistics for the mobile phone 40 at block 154. These statistics may be categorized by hour and, preferably, by day.

Based on these incoming call statistics, the usage pattern performance mode module 86 may then determine at block 156 those time intervals that have an incoming call rate that is less than a first pre-defined threshold. Because the incoming call rate is relatively light during these time intervals, the usage pattern performance mode module 86 defines local times to begin and end one or more extended sleep cycles corresponding to these low incoming call rate time intervals at block 158. In an alternative embodiment, the usage pattern performance mode module 86 may also determine those time intervals that have an incoming call rate that is greater than a second pre-defined threshold. In this case, because the incoming call rate is relatively heavy during these time intervals, the usage pattern performance mode module 86 defines local times to begin and end one or more enhanced responsiveness cycles.

The local times defined by the usage pattern performance mode module 86 and corresponding to the extended sleep cycle interval(s) and/or enhanced responsiveness cycle intervals are stored in the data module 88. These times may then be used by the time of day performance mode module 82 to dynamically adjust the paging channel monitoring frequency based on the current time.

Figure 6:
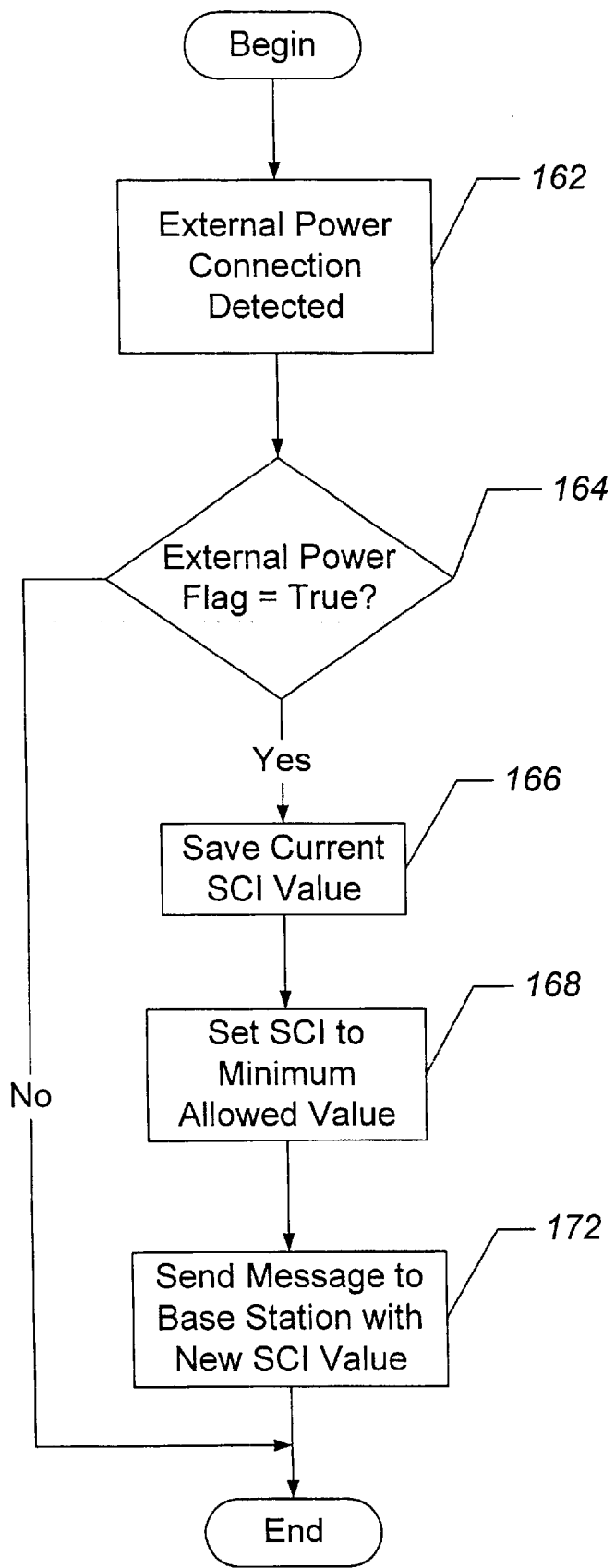
FIGS. 6–7 are flow charts that illustrate exemplary operations of a mobile terminal of FIG. 2 in external power performance mode.

Referring now to FIG. 6, exemplary operations of the external power performance mode module 78 will be described hereafter. If the mobile terminal 40 is connected to an external power source, then, typically, there is no need to conserve battery power. Thus, it is generally desirable to set the SCI parameter to the lowest value allowed to provide maximum responsiveness to incoming calls. Accordingly, at block 162, the external power performance mode module 78 detects that the mobile terminal 40 is connected to an external power source. The external power performance mode module 78 then checks whether the external power performance mode has been selected at block 164 by examining the external power flag stored in the data module 88. If the external power flag is set to a "true" value, then the external power performance mode module 78 saves the current SCI parameter value in the data module 88 at block 166. The SCI parameter is then set to the minimum allowed value at block 168 to maximize the paging channel monitoring frequency. This new value for the SCI parameter is then sent to the base station 58 at block 172. In IS-95 systems (i.e., CDMA technology), the SCI parameter value may be sent to the base station 58 using a parameter change registration message.

Figure 7:
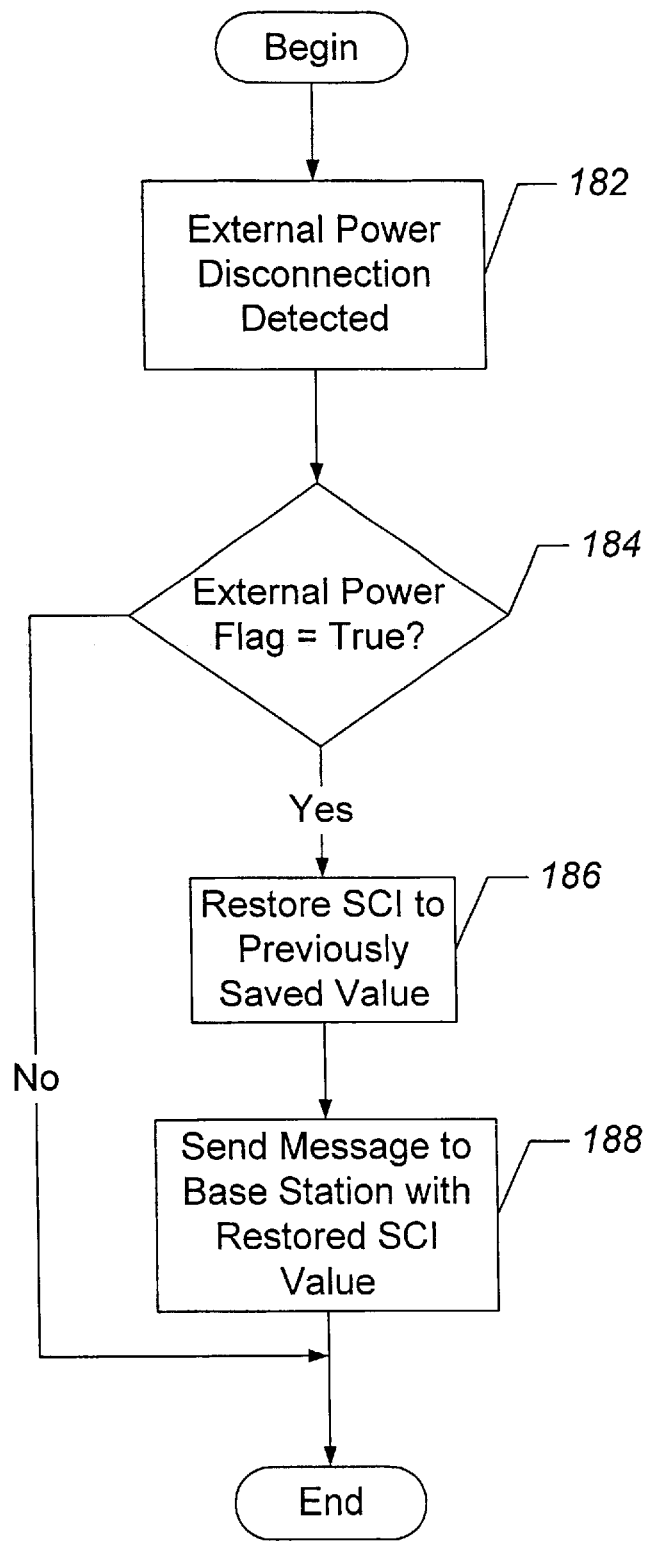

Exemplary operations of the external power performance mode module 78 when the mobile terminal 40 is disconnected from an external power source are described hereafter with reference to FIG. 7. At block 182, the external power performance mode module 78 detects that the mobile terminal 40 has been disconnected from an external power source. The external power performance mode module 78 then checks whether the external power performance mode has been selected at block 184 by examining the external power flag stored in the data module 88. If the external power flag is set to a "true" value, then, at block 186, the external power performance mode module 78 restores the previous SCI parameter value that was saved in the data module 88 at block 166 of FIG. 5. The restored value for the SCI parameter is then sent to the base station 58 at block 188.

Figure 8:
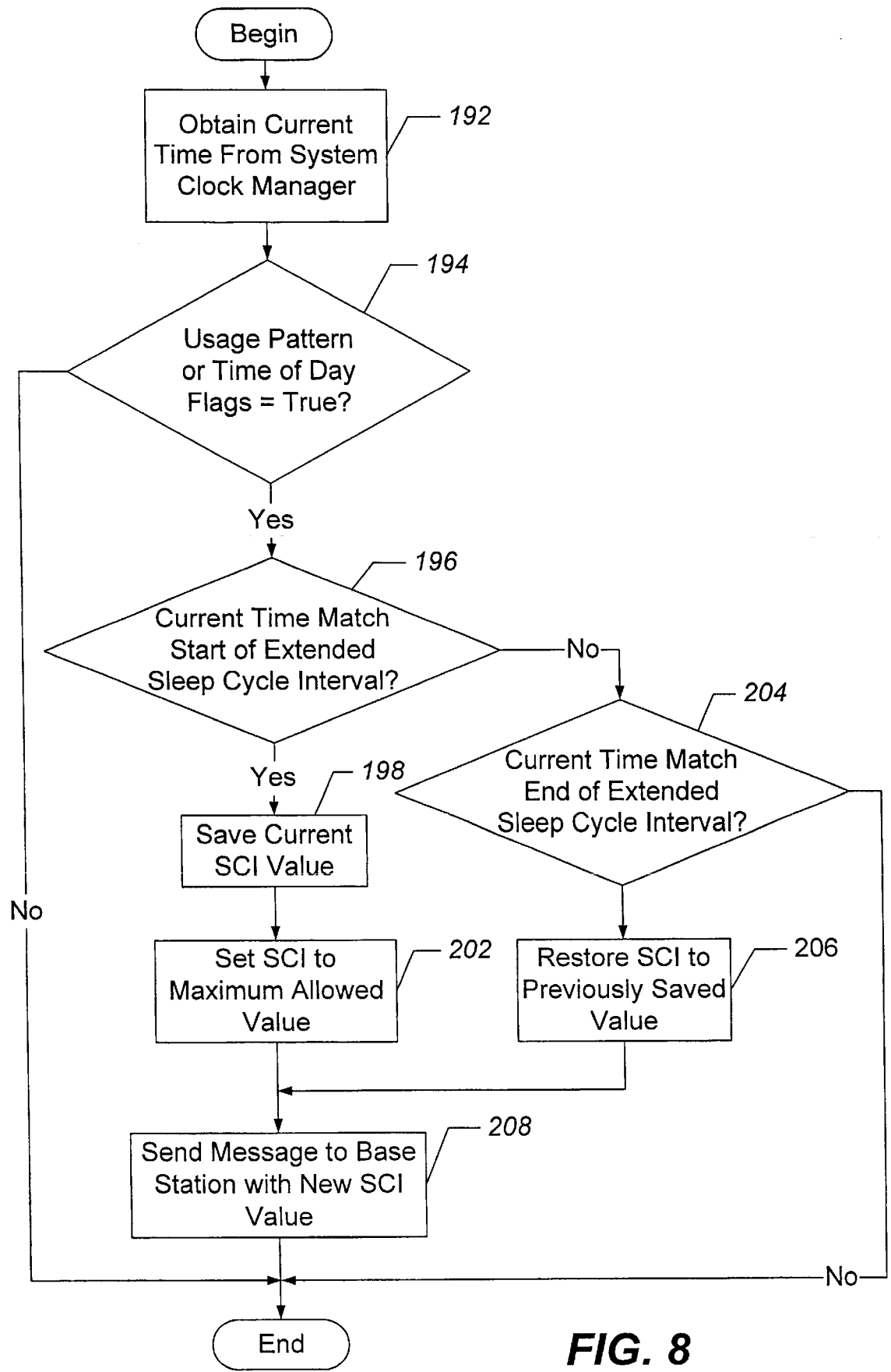
FIG. 8 is a flow chart that illustrates exemplary operations of a mobile terminal of FIG. 2 in time of day performance mode.

Referring now to FIG. 8, exemplary operations of the time of day performance mode module 82 will be described hereafter. Operations begin at block 192 where the time of day performance mode module 82 obtains the current time from the system clock manager. The system clock manager refers generally to those utilities that are typically provided by the operating system 66 for obtaining the current time from the real time system clock. The time of day performance mode module 82 then checks whether the time of day performance mode or the usage pattern performance mode have been selected at block 194 by examining the time of day and usage pattern flags stored in the data module 88. If either the time of day flag or the usage pattern flag is set to a "true" value, then the time of day performance mode module 82 compares any times previously stored in the data module 88 for starting an extended sleep cycle with the current time at block 196. Recall that if the time of day flag is set to a "true" value, then the user may have entered one or more times at which to begin an extended sleep cycle as discussed hereinbefore with respect to FIGS. 4A and 4B. If the usage pattern flag is set to a "true" value, then the usage pattern performance mode module 86 may have defined one or more times to begin an extended sleep cycle as discussed hereinbefore with respect to FIG. 5.

If the current time matches the start of an extended sleep cycle interval as determined at block 196, then the time of day performance mode module 82 saves the current SCI parameter value in the data module 88 at block 198. The SCI parameter is then preferably set to the maximum allowed value at block 202 to minimize the paging channel monitoring frequency, thereby reducing power consumption. If, however, the current time does not match the start of an extended sleep cycle interval as determined at block 196, then the time of day performance mode module 82 compares any times previously stored in the data module 88 for ending an extended sleep cycle interval with the current time at block 204. If the current time matches the end of an extended sleep cycle interval, then the time of day performance mode module 82 restores the previous SCI parameter value that was saved in the data module 88 at block 198. Finally, the SCI parameter value is sent to the base station 58 at block 208.

The operations associated with blocks 196 and 204 (i.e., the comparisons to determine if the current time matches the start or end of an extended sleep cycle interval) may be executed every second or, more typically, may be executed less frequently, such as once per minute. As a result, the current time obtained from the real time system clock may not exactly match the preprogrammed times to begin and end the extended sleep cycle because of the frequency with which the operations of FIG. 8 are performed. The comparisons made at blocks 196 and 204 may, therefore, be modified to determine if the current time matches or has passed the start time for an extended sleep cycle interval or matches or has passed the end time for an extended sleep cycle interval. That is, the time of day performance mode module 82 determines if the current time falls in the time range defined for an extended sleep cycle.

In an alternative embodiment, the operations described with respect to blocks 196 through 206 may also be applied to previously programmed times at which to start an enhanced responsiveness cycle (i.e., increase the paging channel monitoring frequency) and to end an enhanced responsiveness cycle and return to the previous or normal sleep cycle. In this case, the SCI parameter is preferably set to a minimum allowed value at block 202 to improve the responsiveness of the mobile terminal 40 to incoming calls by increasing the paging channel monitoring frequency.

Figure 9:
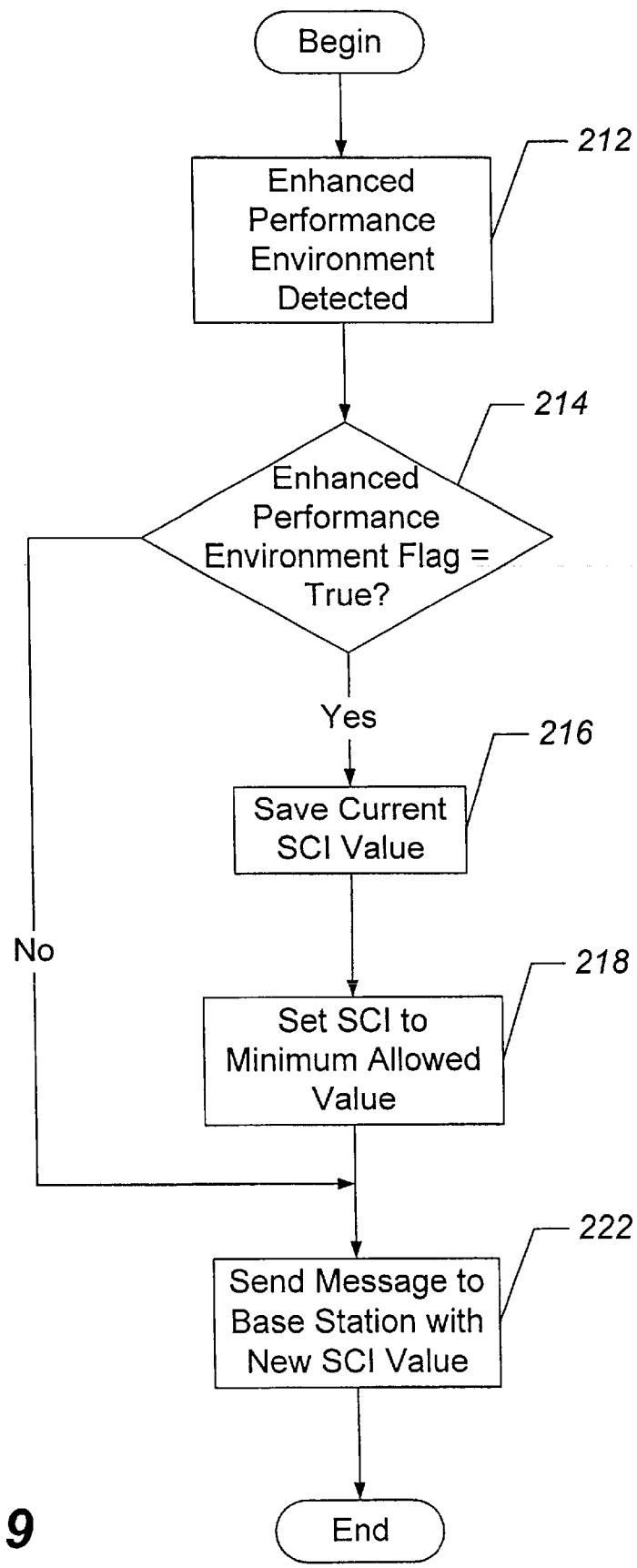
FIGS. 9–10 are flow charts that illustrate exemplary operations of a mobile terminal of FIG. 2 in enhanced performance environment mode.

Referring now to FIG. 9, exemplary operations of the enhanced performance environment mode module 84 will be described hereafter. If the mobile terminal 40 is used in environments such as a home base station, a wireless local loop system, or a private campus system, then it may be desirable for the mobile terminal 40 to treat these environments as enhanced performance environments. That is, it may be desirable to emphasize responsiveness to incoming calls in these environments because incoming call traffic is frequently above average. Accordingly, at block 212, the enhanced performance environment mode module 84 detects that the mobile terminal 40 is present in an enhanced performance environment. The enhanced performance environment mode module 84 then checks whether the enhanced performance environment mode has been selected at block 214 by examining the enhanced performance environment flag stored in the data module 88. If the enhanced performance environment flag is set to a "true" value, then the enhanced performance environment mode module 84 saves the current SCI parameter value in the data module 88 at block 216. The SCI parameter is then set to the minimum allowed value at block 218 to maximize the paging channel monitoring frequency. This new value for the SCI parameter is then sent to the base station 58 at block 222.

Figure 10:
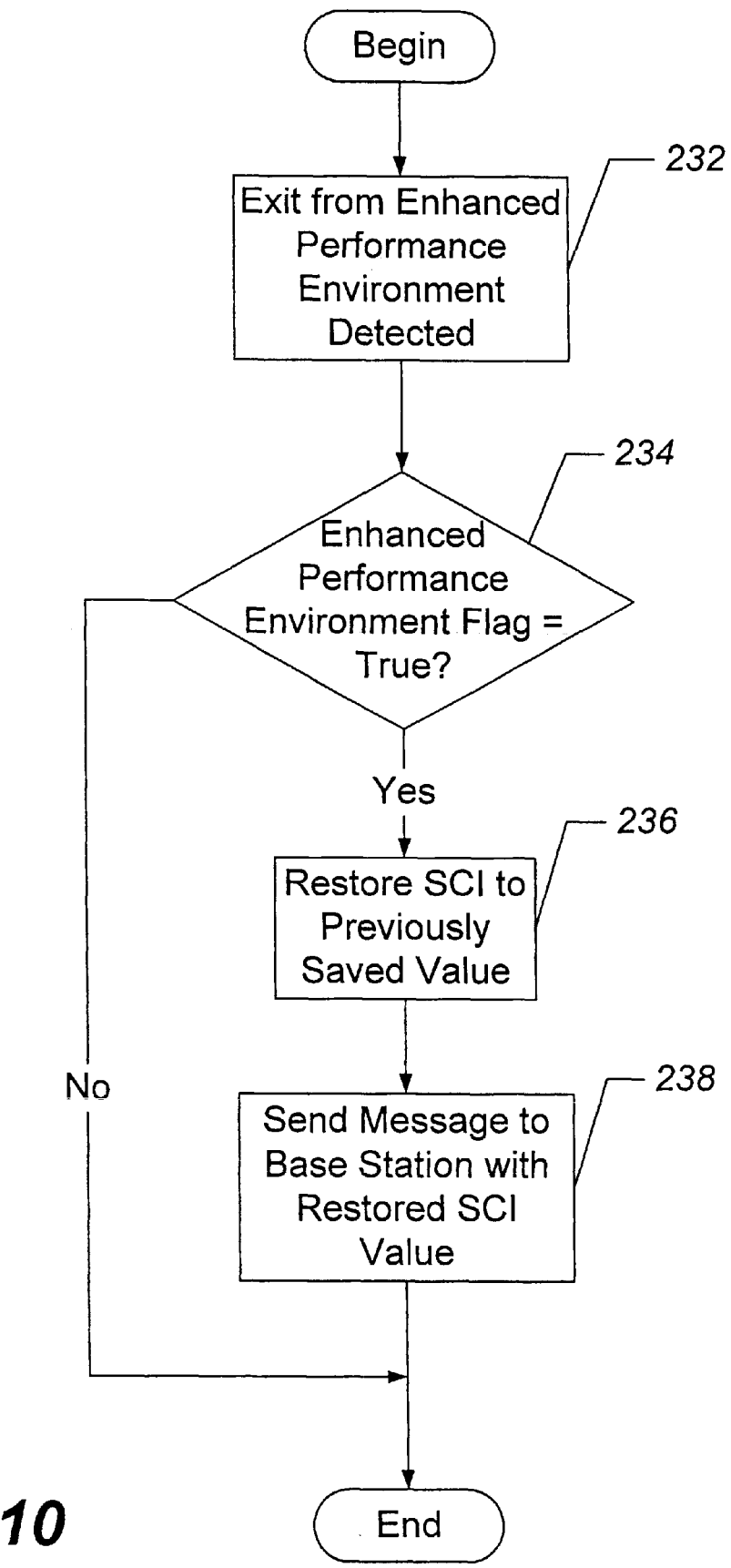

Exemplary operations of the enhanced performance environment mode module 84 when the mobile terminal 40 exits from an enhanced performance environment are described hereafter with reference to FIG. 10. At block 232, the enhanced performance environment mode module 84 detects that the mobile terminal 40 has exited from an enhanced performance environment. The enhanced performance environment mode module 84 then checks whether the enhanced performance environment mode has been selected at block 234 by examining the enhanced performance environment flag stored in the data module 88. If the enhanced performance environment flag is set to a "true" value, then, at block 236, the enhanced performance environment mode module 84 restores the previous SCI parameter value that was saved in the data module 88 at block 216 of FIG. 9. The restored value for the SCI parameter is then sent to the base station 58 at block 238.

As discussed hereinabove, a user may select one or more operating modes for the mobile terminal. If multiple operating modes are selected, however, a hierarchy between the operating modes is preferably implemented to resolve conflicts between selected modes. For example, the external power performance mode may be given precedence over other operating modes such that the paging channel monitoring frequency will remain at a high value for so long as the mobile terminal 40 is connected to an external power source irrespective of other operating environments that the mobile terminal 40 may enter. Similarly, the enhanced performance environment mode may be given precedence over the time of day performance mode such that the paging channel monitoring frequency will be increased when the mobile terminal 40 enters an enhanced performance operating environment even during times that have been preprogrammed for an extended sleep cycle.

Finally, when a user selects an operating mode from the performance mode menu as discussed hereinbefore with reference to FIGS. 4A–4D, the SCI manager program module 74 preferably invokes the corresponding operating mode module to process a change in the operating mode flag based on the user's selection.

The flowcharts of FIGS. 4A–4D and 5–10 show the architecture, functionality, and operation of an exemplary implementation of the mobile terminal 40 software. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 4A–4D and 5–10. For example, two blocks shown in succession in FIGS. 4A–4D and 5–10 may be executed substantially concurrently or the blocks may sometimes be executed in the reverse order, depending upon the functionality involved.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of monitoring a paging channel for incoming calls in a mobile terminal, comprising the steps of:
   determining a current operating environment of the mobile terminal;
   adjusting a paging channel monitoring frequency based on the current operating environment of the mobile terminal;
   obtaining user input to associate operating environments with corresponding paging channel monitoring frequencies, comprising the steps of:
   providing a menu that identifies a plurality of operating modes for the mobile terminal, each operating mode being associated with one of the operating environments; and
   receiving a user selection of at least one of the plurality of operating modes.

2. A method as recited in claim 1, wherein the plurality of operating modes comprise at least one of:
   an external power performance mode;
   a time of day performance mode;
   an enhanced performance environment mode; and
   a usage pattern performance mode.

3. A method as recited in claim 1, wherein the plurality of operating modes comprise a time of day performance mode and the step of receiving a user selection of at least one of the plurality of operating modes comprises the step of receiving a user selection of the time of day performance mode, the method further comprising the steps of:
   receiving a user entry of a local time to decrease the paging channel monitoring frequency from a first frequency value; and
   receiving a user entry of a local time to return the paging channel monitoring frequency to the first frequency value.

4. A method as recited in claim 1, wherein the plurality of operating modes comprise a time of day performance mode and the step of receiving a user selection comprises the step of receiving a user selection of the time of day performance mode, the method further comprising the steps of:
   receiving a user entry of a local time to increase the paging channel monitoring frequency from a first frequency value; and
   receiving a user entry of a local time to return the paging channel monitoring frequency to the first frequency value.

5. A method as recited in claim 1, wherein the plurality of operating modes comprise a usage pattern performance mode and the step of receiving a user selection of at least one of the plurality of operating modes comprises the step of receiving a user selection of the usage pattern performance mode, the method further comprising the steps of:
   collecting incoming call statistics for the mobile terminal; and
   determining at least one time interval to decrease the paging channel monitoring frequency from a first frequency value based on the collected incoming call statistics.

6. A method as recited in claim 5, wherein the step of determining at least one time interval to decrease the paging channel monitoring frequency from the first frequency value based on the collected incoming call statistics comprises the steps of:
   determining at least one time interval that has an incoming call rate less than a pre-defined threshold;
   setting a local time to decrease the paging channel monitoring frequency from the first frequency value based on the at least one time interval that has an incoming call rate less than the pre-defined threshold; and
   setting a local time to return the paging channel monitoring frequency to the first frequency value based on the at least one time interval that has an incoming call rate less than the pre-defined threshold.

7. A method as recited in claim 1, wherein the plurality of operating modes comprise a usage pattern performance mode and the step of receiving a user selection of at least one of the plurality of operating modes comprises the step of receiving a user selection of the usage pattern performance mode, the method further comprising the steps of:

collecting incoming call statistics for the mobile terminal; and determining at least one time interval to increase the paging channel monitoring frequency from a first frequency value based on the collected incoming call statistics.

8. A method as recited in claim 7, wherein the step of determining at least one time interval to increase the paging channel monitoring frequency from the first frequency value based on the collected incoming call statistics comprises the steps of:

determining at least one time interval that has an incoming call rate greater than a pre-defined threshold;

setting a local time to increase the paging channel monitoring frequency from the first frequency value based on the at least one time interval that has an incoming call rate greater than the pre-defined threshold; and setting a local time to return the paging channel monitoring frequency to the first frequency value based on the at least one time interval that has an incoming call rate greater than the pre-defined threshold.

9. A method as recited in claim 1, wherein the step of adjusting the paging channel monitoring frequency based on the current operating environment of the mobile terminal comprises the steps of:

adjusting a value of a slot cycle index (SCI) parameter; and transmitting the SCI parameter value to a base station.

10. A method as recited in claim 1, wherein the step of adjusting the paging channel monitoring frequency based on the current operating environment of the mobile terminal comprises the steps of:

increasing the paging channel monitoring frequency if the current operating environment is determined to include an external power connection for the mobile terminal; and increasing the paging channel monitoring frequency if the current operating environment is determined to be an enhanced performance environment.

11. A system for monitoring a paging channel for incoming calls, comprising:

a base station configured to transmit incoming call messages on the paging channel; and a mobile terminal configured to determine a current operating environment and adjust a paging channel monitoring frequency based on the current operating environment, the mobile terminal comprising:

a user interface configured to obtain user input and associate operating environments with corresponding paging channel monitoring frequencies, the user interface providing a menu that identifies a plurality of operating modes for the mobile terminal, each operating mode being associated with one of the operating environments.

12. A system as recited in claim 11, wherein the mobile terminal is further configured to adjust a slot cycle index (SCI) parameter based on the current operating environment and transmit the SCI parameter to the base station.

13. A system as recited in claim 12, wherein the mobile terminal is further configured to transmit the SCI to the base station in a parameter change registration message.

14. A system as recited in claim 11, wherein the plurality of operating modes comprise at least one of:

an external power performance mode;

a time of day performance mode;

an enhanced performance environment mode; and a usage pattern performance mode.

15. A mobile terminal, comprising:

a receiver configured to monitor a paging channel;

a processor configured to determine a current operating environment and adjust a frequency with which the receiver monitors the paging channel based on the current operating environment; and a user interface configured to obtain user input and associate operating environments with corresponding paging channel monitoring frequencies, the user interface providing a menu that identifies a plurality of operating modes for the mobile terminal, each operating mode being associated with one of the operating environments.

16. A mobile terminal as recited in claim 15, wherein the processor is further configured to adjust a slot cycle index (SCI) parameter based on the current operating environment.

17. A mobile terminal as recited in claim 16, further comprising a transmitter configured to transmit the SCI to a base station in a parameter change registration message.

18. A mobile terminal as recited in claim 15, wherein the plurality of operating modes comprise at least one of:

an external power performance mode;

a time of day performance mode;

an enhanced performance environment mode; and a usage pattern performance mode.

19. A computer program product that monitors a paging channel for incoming calls in a mobile terminal, comprising:

a computer readable storage medium having computer readable program code embodied therein, the computer readable program code comprising:

computer readable program code that determines a current operating environment of the mobile terminal;

computer readable program code that adjusts a paging channel monitoring frequency based on the current operating environment of the mobile terminal;

computer readable program code that obtains user input to associate operating environments with corresponding paging channel monitoring frequencies, comprising:

computer readable program code that provides a menu that identifies a plurality of operating modes for the mobile terminal, each operating mode being associated with one of the operating environments; and computer readable program code that receives a user selection of at least one of the plurality of operating modes.

20. A computer program product as recited in claim 19, wherein the plurality of operating modes comprise at least one of:

an external power performance mode;

a time of day performance mode;

an enhanced performance environment mode; and a usage pattern performance mode.

21. A computer program product as recited in claim 19, wherein the plurality of operating modes comprise a time of day performance mode and the computer readable program code that receives a user selection of at least one of the plurality of operating modes comprise computer readable program code that receives a user selection of the time of day performance mode, the computer program product further comprising:

computer readable program code that receives a user entry of a local time to decrease the paging channel monitoring frequency from a first frequency value; and computer readable program code that receives a user entry of a local time to return the paging channel monitoring frequency to the first frequency value.

22. A computer program product as recited in claim 19, wherein the plurality of operating modes comprise a time of day performance mode and the computer readable program code that receives a user selection comprises computer readable program code that receives a user selection of the time of day performance mode, the computer program product further comprising:

computer readable program code that receives a user entry of a local time to increase the paging channel monitoring frequency from a first frequency value; and computer readable program code that receives a user entry of a local time to return the paging channel monitoring frequency to the first frequency value.

23. A computer program product as recited in claim 19, wherein the plurality of operating modes comprise a usage pattern performance mode and the computer readable program code that receives a user selection of at least one of the plurality of operating modes comprises computer readable program code that receives a user selection of the usage pattern performance mode, the computer program product further comprising:

computer readable program code that collects incoming call statistics for the mobile terminal; and computer readable program code that determines at least one time interval to decrease the paging channel monitoring frequency from a first frequency value based on the collected incoming call statistics.

24. A computer program product as recited in claim 23, wherein the computer readable program code that determines at least one time interval to decrease the paging channel monitoring frequency from the first frequency value based on the collected incoming call statistics comprises:

computer readable program code that determines at least one time interval that has an incoming call rate less than a pre-defined threshold;

computer readable program code that sets a local time to decrease the paging channel monitoring frequency from the first frequency value based on the at least one time interval that has an incoming call rate less than the pre-defined threshold; and computer readable program code that sets a local time to return the paging channel monitoring frequency to the first frequency value based on the at least one time interval that has an incoming call rate less than the pre-defined threshold.

25. A computer program product as recited in claim 19, wherein the plurality of operating modes comprise a usage pattern performance mode and the computer readable program code that receives a user selection of at least one of the plurality of operating modes comprises computer readable program code that receives a user selection of the usage pattern performance mode the computer readable program code further comprising the steps of:

computer readable program code that collects incoming call statistics for the mobile terminal; and computer readable program code that determines at least one time interval to increase the paging channel monitoring frequency from a first frequency value based on the collected incoming call statistics.

26. A computer program product as recited in claim 25, wherein the computer readable program code that determines at least one time interval to increase the paging channel monitoring frequency from the first frequency value based on the collected incoming call statistics comprises:

computer readable program code that determines at least one time interval that has an incoming call rate greater than a pre-defined threshold;

computer readable program code that sets a local time to increase the paging channel monitoring frequency from the first frequency value based on the at least one time interval that have an incoming call rate greater than the pre-defined threshold; and computer readable program code that sets a local time to return the paging channel monitoring frequency to the first frequency value based on the at least one time interval that has an incoming call rate greater than the pre-defined threshold.

27. A computer program product as recited in claim 19, wherein the computer readable program code that adjusts the paging channel monitoring frequency based on the current operating environment of the mobile terminal comprises:

computer readable program code that adjusts a value of a slot cycle index (SCI) parameter; and computer readable program code that transmits the SCI parameter value to a base station.

28. A computer program product as recited in claim 19, wherein the computer readable program code that adjusts the paging channel monitoring frequency based on the current operating environment of the mobile terminal comprises:

computer readable program code that increases the paging channel monitoring frequency if the current operating environment is determined to include an external power connection for the mobile terminal; and computer readable program code that increases the paging channel monitoring frequency if the current operating environment is determined to be an enhanced performance environment.

29. A mobile terminal, comprising:

means for determining a current operating environment of the mobile terminal; and means for adjusting a paging channel monitoring frequency based on the current operating environment of the mobile terminal;

means for obtaining user input to associate operating environments with corresponding paging channel monitoring frequencies, comprising:

means for providing a menu that identifies a plurality of operating modes for the mobile terminal, each operating mode being associated with one of the operating environments; and means for receiving a user selection of at least one of the plurality of operating modes.

30. A mobile terminal as recited in claim 29, wherein the plurality of operating modes comprise at least one of:

an external power performance mode;

a time of day performance mode;

an enhanced performance environment mode; and a usage pattern performance mode.

31. A mobile terminal as recited in claim 29, wherein the plurality of operating modes comprise a time of day performance mode and the means for receiving a user selection of at least one of the plurality of operating modes comprises means for receiving a user selection of the time of day performance mode, the mobile terminal further comprising:

means for receiving a user entry of a local time to decrease the paging channel monitoring frequency from a first frequency value; and means for receiving a user entry of a local time to return the paging channel monitoring frequency to the first frequency value.

32. A mobile terminal as recited in claim 29, wherein the plurality of operating modes comprise a time of day performance mode and the means for receiving a user selection comprises means for receiving a user selection of the time of day performance mode, the mobile terminal further comprising:

means for receiving a user entry of a local time to increase the paging channel monitoring frequency from a first frequency value; and means for receiving a user entry of a local time to return the paging channel monitoring frequency to the first frequency value.

33. A mobile terminal as recited in claim 29, wherein the plurality of operating modes comprise a usage pattern performance mode and the means for receiving a user selection of at least one of the plurality of operating modes comprises means for receiving a user selection of the usage pattern performance mode, the mobile terminal further comprising:

means for collecting incoming call statistics for the mobile terminal; and means for determining at least one time interval to decrease the paging channel monitoring frequency from a first frequency value based on the collected incoming call statistics.

34. A mobile terminal as recited in claim 33, wherein the means for determining at least one time interval to decrease the paging channel monitoring frequency from the first frequency value based on the collected incoming call statistics comprises:

means for determining at least one time interval that has an incoming call rate less than a pre-defined threshold;

means for setting a local time to decrease the paging channel monitoring frequency from the first frequency value based on the at least one time interval that has an incoming call rate less than the pre-defined threshold; and means for setting a local time to return the paging channel monitoring frequency to the first frequency value based on the at least one time interval that has an incoming call rate less than the pre-defined threshold.

35. A mobile terminal as recited in claim 29, wherein the plurality of operating modes comprise a usage pattern performance mode and the means for receiving a user selection of at least one of the plurality of operating modes comprise means for receiving a user selection of the usage pattern performance mode, the mobile terminal further comprising:

means for collecting incoming call statistics for the mobile terminal; and means for determining at least one time interval to increase the paging channel monitoring frequency from a first frequency value based on the collected incoming call statistics.

36. A mobile terminal as recited in claim 35, wherein the means for determining at least one time interval to increase the paging channel monitoring frequency from the first frequency value based on the collected incoming call statistics comprises:

means for determining at least one time interval that has an incoming call rate greater than a pre-defined threshold;

means for setting a local time to increase the paging channel monitoring frequency from the first frequency value based on the at least one time interval that has an incoming call rate greater than the pre-defined threshold; and means for setting a local time to return the paging channel monitoring frequency to the first frequency value based on the at least one time intervals that has an incoming call rate greater than the pre-defined threshold.

37. A mobile terminal as recited in claim 29, wherein the means for adjusting the paging channel monitoring frequency based on the current operating environment of the mobile terminal comprises:

means for adjusting a value of a slot cycle index (SCI) parameter; and means for transmitting the SCI parameter value to a base station.

38. A mobile terminal as recited in claim 29, wherein the means for adjusting the paging channel monitoring frequency based on the current operating environment of the mobile terminal comprises:

means for increasing the paging channel monitoring frequency if the current operating environment is determined to include an external power connection for the mobile terminal; and means for increasing the paging channel monitoring frequency if the current operating environment is determined to be an enhanced performance environment.

* * * * *